United States Patent [19]

Bachmann et al.

[11] Patent Number: 5,384,195
[45] Date of Patent: Jan. 24, 1995

[54] ANTIFRICTION BODY HAVING AN ANTIFRICTION LAYER

[75] Inventors: Peter Bachmann, Würselen; Dieter Leers, Stolberg-Breinig; Detlef Wiechert, Alsdorf, all of Germany

[73] Assignee: U.S. Philips Corporation, New York, N.Y.

[21] Appl. No.: 66,950

[22] Filed: May 24, 1993

Related U.S. Application Data

[63] Continuation-in-part of Ser. No. 63,345, May 18, 1993, abandoned.

[30] Foreign Application Priority Data

May 22, 1992 [DE] Germany .............................. 4216993

[51] Int. Cl.$^6$ .............................................. G11B 5/22
[52] U.S. Cl. ................................... 428/408; 360/122; 423/446
[58] Field of Search ............... 428/408; 156/DIG. 68; 423/446; 360/122

[56] References Cited

U.S. PATENT DOCUMENTS

| | | | |
|---|---|---|---|
| 4,695,321 | 9/1987 | Akashi et al. | 428/408 |
| 4,968,647 | 11/1990 | Darrell | 501/99 |
| 5,243,170 | 9/1993 | Marayama et al. | 219/121.59 |

FOREIGN PATENT DOCUMENTS 59-127214 7/1984 Japan .

Primary Examiner—A. A. Turner
Attorney, Agent, or Firm—John C. Fox

[57] ABSTRACT

The invention relates to an antifriction body (3), in particular for a magnetic head (1), whose antifriction surface (4) is provided with an antifriction layer (4) which contains diamond crystals and which is provided by means of a CVD process. Damage to the elements sliding past the antifriction layer is precluded in that the antifriction layer (4) contains hexagonal lonsdaleite crystals.

6 Claims, 2 Drawing Sheets

ANTIFRICTION BODY HAVING AN ANTIFRICTION LAYER

This is a continuation-in-part of application Ser. No. 08/063,345 filed May 18, 1993 now abandoned.

BACKGROUND OF THE INVENTION

The invention relates to a slider, in particular for a magnetic head, the antifriction surface of said body being provided with an antifriction layer which contains diamond crystals and which is provided by means of a CVD process.

In order to prolong the life of magnetic heads and to obtain constant recording and playback properties as well as to protect the magnetic heads against chemical attack, it is known to provide said magnetic heads, as used in audio recorders and video recorders or for storing other types of information, with a thin, low-friction layer which is resistant to wear and, to the extent possible, to chemical attack. To obtain a high signal level, the distance between the recording medium (for example magnetic tape) and the magnetic head should be less than 100 nm. A constant recording and playback quality can only be attained when the distance between the recording medium and the magnetic head does not noticeably change during the life of the head. However, if the magnetic head and the recording medium have been in operation for a relatively long period of time they may both be subject to abrasion causing the recording and playback quality to be adversely affected. If the surface of the magnetic head is too hard and/or too rough the recording medium may become damaged. Besides, some recording media, in particular magnetic tapes, contain residues of aggressive chemical substances, such as chlorine, which evaporate from the tape material and can corrode the magnetic head.

In JP 59-127214 A (English-language Abstract) a description is given of an arrangement as described in the opening paragraph, in which a slider of a magnetic head is provided with a thin carbon layer by means of a PCVD process. Said carbon layer, which contains diamond and graphite structures, serves to increase the hardness and antifriction properties of the antifriction surface of the magnetic head.

Layers comprising crystalpeak diamond are hard and hence abrasion resistant, however, owing to their coarse polycrystalpeak structure they cause excessive damage to, in particular, magnetic tapes.

OBJECTS AND SUMMARY OF THE INVENTION

It is an object of the invention to construct the antifriction layer of the antifriction body of the type mentioned in the opening paragraph in such a manner that elements, such as in particular magnetic tapes, which slide past the antifriction layer are less subject to damage and can slide with a low coefficient of friction.

This object is achieved in that the antifriction layer contains hexagonal lonsdaleite crystals whose volume percentage in the antifriction layer, with respect to the volume percentage of diamond crystals, is selected to be such that the intensity ratio, measured on the antifriction layer, between the <100> diffraction peak of lonsdaleite and the <111> diffraction peak of diamond in the X-ray diffraction spectrum exceeds 0.02.

In this manner, antifriction layers are obtained which are not only resistant to abrasion but which are also exceptionally smooth and which also have a very low level of friction, so that, for example, magnetic tapes are hardly damaged. This can be attributed to the fact that in addition to cubic diamond crystals, the antifriction layer also comprises a substantial quantity of hexagonal lonsdaleite crystals.

In the manufacture, a sufficient volume percentage of lonsdaleite can be achieved by a suitable choice of the process parameters. Preferably, plasma-activated CVD processes (PCVD) have proved to be suitable, in which processes the crystalpeak structures of the antifriction layer are formed directly on the deposition surface of the antifriction body. In this case, it is unnecessary to first form particles which are then cemented to a surface to be coated of a slider by means of a bonding agent. The layers thus formed would not be thin enough and their adhesive properties would be insufficient. By contrast, antifriction layers in accordance with the invention which are provided by PCVD adhere without additional measures.

The properties of antifriction layers in accordance with the invention are not substantially affected if said antifriction layers alternatively comprise diamond-like carbons (DLC) and/or crystalpeak graphite and/or amorphous graphite. Very advantageous antifriction layers in accordance with the invention are obtained if the volume percentage of lonsdaleite crystals in the antifriction layer, with respect to the volume percentage of diamond crystals, is selected to be such that the Raman spectrum of the antifriction layer exhibits two broad peaks at $1140\pm20$ cm$^{-1}$ and $1470\pm20$ cm$^{-1}$. Particularly fine-crystalpeak structures are obtained when the half-width of the broad peaks ranges between 5 and 100 cm$^{-1}$.

Advantageous layers can alternatively be obtained when, for the antifriction layer 4, the intensity ratio between the peak measured at 1332 cm$^{-1}$ and the peaks measured at $1140\pm20$ cm$^{-1}$ and at $1470\pm20$ cm-1 is smaller than 1.

Lonsdaleite is a crystalpeak carbon found in meteorites, and it has already been manufactured synthetically. For example, in accordance with U.S. Pat. No. 4,968,647 lonsdaleite was integrated in diamond-ceramic or carbide- ceramic material to increase the toughness.

The presence of lonsdaleite crystals in a layer as well as its proportion are generally detected spectrographically (Raman spectrum, X-ray diffraction spectrum).

Antifriction layers in accordance with the invention were manufactured by means of suitably adapted PCVD processes. Sufficient quantifies of lonsdaleite were obtained by choosing the reactor pressure to be relatively low, as compared with the reactor pressure normally used during diamond deposition or by choosing a relatively high substrate temperature or by reacting mixtures of acetylene and oxygen at a pressure of approximately 50 mbar. However, said processes and/or process parameters are not to be regarded as limitative.

BRIEF DESCRIPTION OF THE DRAWINGS

The invention will be explained in greater detail by means of the accompanying drawings, in which FIG. 1 diagrammatically shows a magnetic head having a slider which is coated with an antifriction layer in accordance with the invention.

DESCRIPTION OF THE PREFERRED EMBODIMENTS

Figure 1:
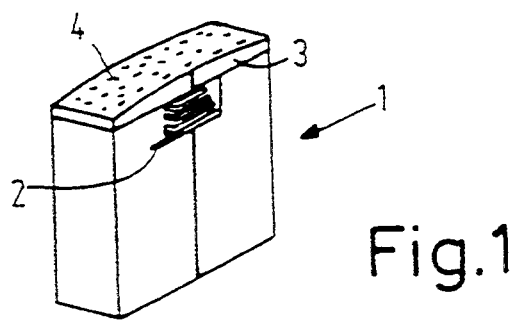

FIG. 1 shows a magnetic head 1 having a winding 2 and a slider 3 of Mn-Zn-ferrite. Said antifriction slider 3 is provided with a carbon layer 4 in a single deposition step by means of a PCVD process, said carbon-antifriction layer comprising diamond crystals and, in accordance with the invention, lonsdaleite crystals.

Figure 2:
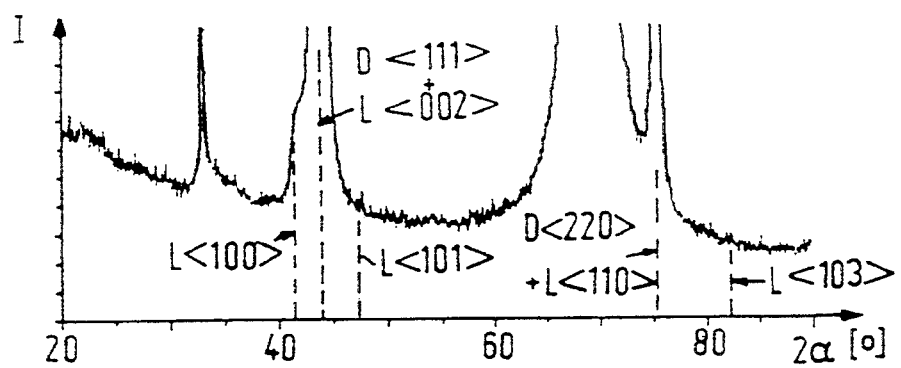
FIG. 2 shows the X-ray diffraction diagram of the antifriction layer in accordance with FIG. 1.

FIG. 2 shows an X-ray diffraction spectrum of the antifriction layer 4, measured by copper-K-alpha 1-radiation. The intensity I of the diffraction radiation is plotted as a function of the diffraction angle $2\alpha$. The diffraction peaks to be associated with the characteristic crystal planes are measured. In the diagram, the indices of the crystal plane are additionally provided with the symbol D for diamond and L for lonsdaleite.

It is known that in the X-ray diffraction diagram of cubic diamond crystals, inter alia, a large D<111> diffraction peak occurs at a diffraction angle of $2\alpha = 44°$ and a smaller D<220> diffraction peak occurs at a diffraction angle of $2\alpha = 75°$. In the case of hexagonal lonsdaleite crystals, large diffraction peaks L<100> and L<002> occur at diffraction angles of $2\alpha = 41°$ and $2\alpha = 44°$, respectively, as well as smaller diffraction peaks, notably L<101>, L<102>, L<110>, L<103>.

Figure 3:
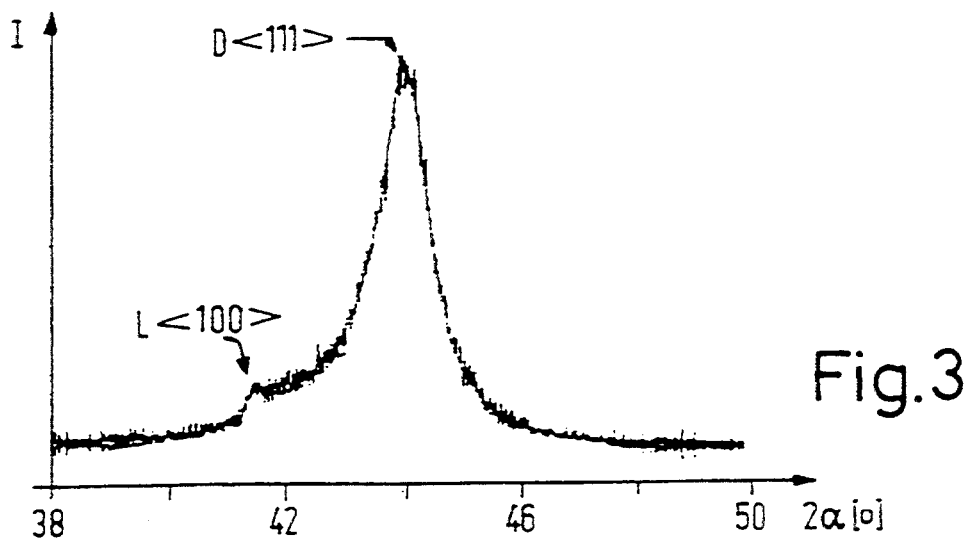
FIG. 3 shows a part of FIG. 2 on an enlarged scale.

As the inventive antifriction layer comprises both diamond crystals and lonsdaleite crystals, the characteristic diffraction peaks of diamond and lonsdaleite also occur in the X-ray diffraction spectrum shown in FIG. 2. However, as a result of the small quantity of lonsdaleite, as compared to diamond, also the "large" L<100> diffraction peak is relatively little pronounced, as compared with the D<111> diffraction peak. In FIG. 3, the L<100> and D<111> peaks are clearly recognizable due to the enlarged scale of abscissae. The intensity ratio between said peaks governs the quantitative ratio of lonsdaleite to diamond. The following Table lists, for samples 1 up to and including 11, the intensity ratios i, measured in the X-ray diffraction spectrum, between the <100> diffraction peak of lonsdaleite and the <111> diffraction peak of diamond. The ratios between the surfaces below the peaks are denoted by $i_a$ and the corresponding peak ratios are denoted by $i_p$.

of the in each case hard carbon layer was not observed in any of the samples.

Figure 4:
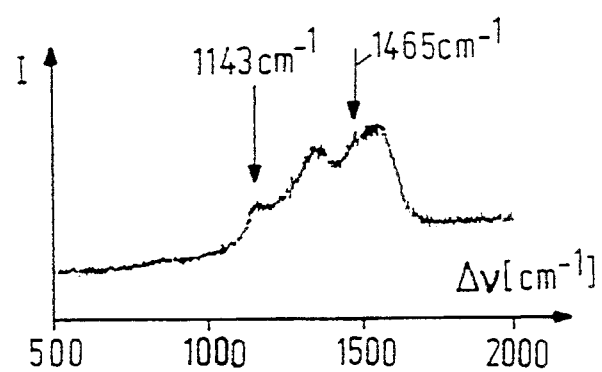
FIG. 4 shows the Raman spectrum of an antifriction layer in accordance with the invention.

FIG. 4 shows the Raman spectrum at the antifriction layer 4 shown in FIG. 1. The Raman spectral peak at 1332 cm$^{-1}$, which is typical of diamond, cannot be observed. However, the broad peaks at $1145 \pm 20$ cm$^{-1}$ and at $1470 \pm 20$ cm$^{-1}$, which are typical of layers which can be used in accordance with the invention, are very pronounced. In the example in accordance with FIG. 4, the peaks are situated at 1143 cm$^{-1}$ and at 1465 cm$^{-1}$ and are indicated by arrows.

Figure 5:
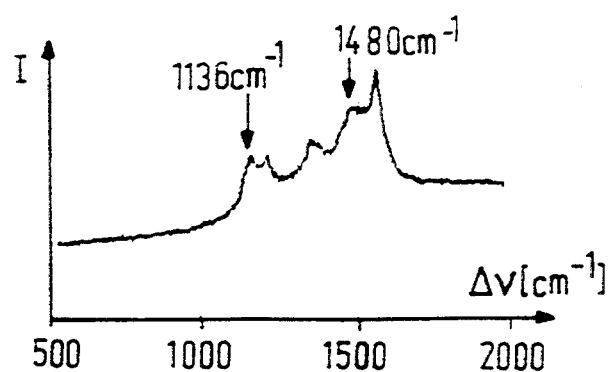
FIG. 5 shows the Raman spectrum of an alternatively manufactured antifriction layer in accordance with the invention.

FIG. 5 shows the Raman spectrum of an inventive antifriction layer manufactured with different process parameters. An acetylene/oxygen mixture was used as the starting gas in the microwave-plasma-CVD process. Also in this case, the typical Raman peaks are visible at $1145 \pm 20$ cm$^{-1}$ (in this case at 1136 cm$^{-1}$) and at $1470 \pm 20$ cm$^{-1}$ (in this case at 1480 cm$^{-1}$) and, also in this case, the peak at 1332 cm$^{-1}$ which relates to diamond is hardly visible.

We claim:

1. A magnetic head slider (3), the antifriction surface of said slider being provided with an antifriction layer (4) which contains diamond crystals and which antifriction layer (4) is provided by means of a CVD process, characterized in that said antifriction layer (4) contains hexagonal lonsdaleite crystals whose volume percentage in the antifriction layer (4), with respect to the volume percentage of diamond crystals, is selected to be such that the intensity ratio, measured on the antifriction layer, between the <100> diffraction peak of lonsdaleite and the <111> the diffraction peak of diamond in the X-ray diffraction spectrum exceeds 0.02.

2. The magnetic head slider as claimed in claim 1, characterized in that the volume percentage of lonsdaleite crystals in the antifriction layer, with respect to the volume percentage of diamond crystals, is selected to be such that the Raman spectrum of the antifriction layer (4) exhibits two broad peaks at $1140 \pm 20$ cm$^{-1}$ and $1470 \pm 20$ cm$^{-1}$.

3. The magnetic head slider as claimed in claim 2, characterized in that the half-width of the broad peaks ranges between 5 and 100 cm$^{-1}$.

4. The magnetic head slider as claimed in claim 1, characterized in that, for the antifriction layer, the intensity ratio between the peak measured at 1332 cm$^{-1}$ and the peaks measured at $1140 \pm 20$ cm$^{-1}$ and at $1470 \pm 20$ cm$^{-1}$ is smaller than 1.

5. An antifriction body as claimed in claim 2, characterized in that, for the antifriction layer, the intensity ratio between the peak measured at 1332 cm$^{-1}$ and the peaks measured at $1140 \pm 20$ cm$^{-1}$ and at $1470 \pm 20$

|  | Sample No. | | | | | | | | | | |
|---|---|---|---|---|---|---|---|---|---|---|---|
|  | 1 | 2 | 3 | 4 | 5 | 6 | 7 | 8 | 9 | 10 | 11 |
| $i_p$ | 0 | <0.001 | 0.001 | 0.003 | 0.007 | 0.015 | 0.032 | 0.035 | 0.049 | 0.054 | 0.097 |
| $i_a$ | 0 | 0.001 | 0.004 | 0.005 | 0.007 | 0.018 | 0.031 | 0.034 | 0.080 | 0.030 | 0.046 |

A commercially available video tape (thickness 18 $\mu$m) was pressed on to each of the carbon layers of these samples by means of a ruby ball (diameter of 1.5 mm) with a pressure of 1 Newton. After passage of the tape, it was found that damage, in the form of clearly visible grooves, had been caused to samples 1 up to and including 6. By contrast, as regards the samples 7 upto and including 11, no grooves could be observed. Abrasion cm$^{-1}$ is smaller than 1.

6. An antifriction body as claimed in claim 3, characterized in that, for the antifriction layer, the intensity ratio between the peak measured at 1332 cm$^{-1}$ and the peaks measured at $1140 \pm 20$ cm$^{-1}$ and at $1470 \pm 20$ cm$^{-1}$ is smaller than 1.

* * * * *